United States Patent [19]

Shimely et al.

[11] 3,725,302

[45] Apr. 3, 1973

[54] SILANIZED CRYSTALLINE ALUMINO-SILICATE

[75] Inventors: Jesse H. Shimely; Edward D. Archer, Beacon, N.Y.

[73] Assignee: Texaco Inc., New York, N.Y.

[22] Filed: Aug. 31, 1970

[21] Appl. No.: 68,552

Related U.S. Application Data

[60] Division of Ser. No. 850,285, June 17, 1969, Pat. No. 3,658,696, which is a continuation-in-part of Ser. No. 595,734, Nov. 21, 1966, abandoned.

[52] U.S. Cl.........252/431 R, 252/455 Z, 260/448 C, 260/448.2 R
[51] Int. Cl. ...........................C07f 7/22, B01j 11/40
[58] Field of Search....252/431 R, 455 Z; 260/448 C, 260/448.2 D, 448.2 H; 55/75

[56] References Cited

UNITED STATES PATENTS

3,536,521 10/1970 McKinney et al. ........................55/75
3,398,177 8/1968 Stewart .............................260/448.2

*Primary Examiner*—C. F. Dees
*Attorney*—R. E. Kavanagh and Thomas H. Whaley

[57] ABSTRACT

The external surfaces of crystalline aluminosilicates are treated with hydrocarbyl halosilanes or their condensation products with ammonia, primary amines, secondary amines or alcohols to modify the surface adsorptive properties of the aluminosilicates. In separation processes employing crystalline aluminosilicates wherein the surface adsorbed materials must be removed in a purging operation before the initially adsorbed materials are recovered, silanizing the external surface of the aluminosilicates greatly reduces the time or severity of the purging operation.

15 Claims, 2 Drawing Figures

SILANIZED CRYSTALLINE ALUMINO-SILICATE

CROSS-REFERENCES TO RELATED APPLICATIONS

This is a division of application Ser. No. 850,285, filed June 17, 1969 (now U.S. Pat. No. 3,658,696), which is a continuation-in-part of application Ser. No. 595,734, filed Nov. 21, 1966, now abandoned.

This invention relates to silanized crystalline metal aluminosilicates and to a process for using said silanized crystalline metal aluminosilicates in the separation of compounds having different effective molecular diameters. These metal aluminosilicates are also known as crystalline zeolites and are commonly referred to as molecular sieves.

As used herein the term, molecular sieve, includes both natural and synthetic crystalline zeolites.

A molecular sieve will reject a molecule that has a maximum dimension of its minimum projected cross-sectional area larger than that of the nominal pore diameter of the molecular sieve. This particular molecular dimension, which relates to the molecule being adsorbed or rejected by the molecular sieve, is referred to herein as the "effective molecular diameter", or the "effective diameter" of the molecule.

Crystalline metal aluminosilicates, or to use the more common reference, molecular sieves, have a unique crystalline structure which upon dehydration results in a network of empty cages or crystallographic unit cells interconnected by pores. Further, these pores are precisely uniform in diameter which permits a sieving or screening action in the molecular size range of the pore diameter. Thus, molecules small enough to pass through these uniform pores are adsorbed in the sieve cages while larger molecules are excluded.

For most uses, synthetic molecular sieve crystals, generally 1–5 microns in size, are bonded with clay and formed into extruded pellets. Molecular sieves in these forms are commercially available in a series of uniform pore diameters that permit the passage into the sieve cages of molecules having effective diameters less than 3, 4, 5, 8 or 10 angstroms. Molecules below these specific effective diameters may therefore be adsorbed within the sieve cages by passing through the uniform pores. Larger molecules having a polar character are adsorbed on the external surface of the pellet or in the intercrystalline voids of the pellet.

Recently crystalline metal aluminosilicates having uniform pore size between 3 and 15 A have found extensive commercial utilization in the separation of components of mixtures based on the different effective molecular diameters of the components of the mixture. Particular striking utilization of these molecular sieves is in the separation of straight chain hydrocarbons from a mixture of straight chain and non-straight chain hydrocarbons by contacting the mixture with a so-called type 5A molecular sieve in which the sieve has uniform pore openings of about 5 A which permits the pores to pass straight chain hydrocarbons into the sieve cages while rejecting the non-straight chain hydrocarbons. All of the latter have effective molecular diameters substantially larger than 5 A. Straight chain hydrocarbons separated in this manner from kerosene and gas oil fractions are now being widely used in the manufacture of biodegradable detergents.

By "straight chain" hydrocarbons is meant any aliphatic or acyclic or open chain hydrocarbon which does not possess side chain branching. Representative straight chain hydrocarbons are the normal paraffins and the normal olefins, mono- or polyolefins, including the straight chain acetylene hydrocarbons. By "non-straight chain" hydrocarbon is meant the aromatic and naphthenic hydrocarbons as well as the iso-paraffinic, isoolefinic hydrocarbons and the like.

Through usage in the art, the term "normals" is used to indicate the hydrocarbons adsorbed within the sieve cages of a type 5A molecular sieve and the term "non-normals" to refer to those hydrocarbons whose effective particle diameters are greater than 5 A thereby preventing their entrance into the sieve cages. These terms are equivalent to and are used interchangeably with the terms "straight chain hydrocarbons" and "non-straight chain hydrocarbons" respectively.

Thus, in a hydrotreated kerosene, the straight chain hydrocarbons are essentially normal paraffins while the non-straight chain hydrocarbons include the aromatics, cycloaliphatics, and isoparaffins. When kerosene is contacted with a bed of type 5A molecular sieves, the normal paraffins are adsorbed within the sieve cages or crystallographic unit cells while most of the non-straight chain hydrocarbons pass through the bed. However, some of the non-normals and to a minor extent some of the normals are adsorbed on the surface of the sieve and in the intercrystalline voids of the sieve pellet. The amount of each hydrocarbon adsorbed on the surface depends upon its polarity and its molar proportion in the mixture being processed.

For convenience the expression "surface-adsorbed hydrocarbons" when used hereinafter will include all hydrocarbons other than those adsorbed within the sieve cages of the molecular sieve pellet and will include those adsorbed in the intercrystalline voids as well as those adsorbed on the surface of the pellet. Also the term "pore adsorbed hydrocarbons" will refer to those adsorbed within the sieve cage, i.e., those which passed through the pores of uniform diameter.

The presence of these surface-adsorbed hydrocarbons makes it highly desirable to employ a purging operation prior to desorbing the straight chain hydrocarbon from within the sieve cages in order to achieve maximum purity of these normal hydrocarbons. The purge step is normally effected by reducing the pressure on the sieves, contacting them with a purge medium or a combination thereof. After substantially removing the surface adsorbed components, the sieves are desorbed to remove the pore adsorbed hydrocarbons. Often the purge operation is merely the first portion of the desorbing operation and the same material serves as the purge and the desorbing medium. The effluent from the purging is segregated from the desorbing effluent since it contains substantially all of the adsorbed non-normals.

In this cycle operation, straight chain hydrocarbons in the feed are selectively adsorbed from the feed stock by the molecular sieves. These straight chain hydrocarbons are then desorbed from the sieves and recovered from the desorbent in extremely high purities. The key to producing high purity straight chain hydrocarbons is the purge step between the adsorption and desorption steps. Following the adsorption step, the sieve bed pres- sure is usually reduced and a small flow of desorbent medium introduced as a purge stream. This purge displaces residual feed stock from the void spaces in the bed and removes from the sieves the surface adsorbed hydrocarbons which are essentially non-straight chain hydrocarbons. The duration of the purging determines the extent to which the non-straight chain hydrocarbons are removed from the sieve bed which in turn establishes the ultimate purity of the straight chain hydrocarbons removed during the subsequent desorption.

In purging the sieve bed to remove non-straight chain hydrocarbons some of the straight chain hydrocarbons adsorbed in the sieve cages are also desorbed. The percentage of adsorbed straight chain hydrocarbons which are desorbed increases as the amount of purging increases. Thus, the effective capacity of the sieve for recovering straight chain hydrocarbons during the desorbing step is decreased, with increasing purge severity, by the percentage of straight chain hydrocarbons removed during purging. For most economical operation, the amount of purging should ideally be maintained as low as possible while at the same time being sufficient to produce a straight chain hydrocarbon product of the desired purity. To further optimize the recovery of straight chain hydrocarbons, the effluent from the purge is often recycled back to the feed inlet line.

Therefore anything which will reduce the amount of non-straight chain hydrocarbons which are surface adsorbed or which makes it easier to remove these surface adsorbed hydrocarbons during the purging step is most desirable since it will either produce a higher purity straight chain hydrocarbon for the same degree of purging severity or the same purity product with a less severe purging step. A concomitant advantage of less severe purging step is that fewer straight chain hydrocarbons are removed by the purging medium thereby reducing the volume of the recycled purge effluent, the quantity of sieve required to process the recycled straight chain paraffins in that stream and, if a normally-liquid desorbent is used, the amount of fractionating equipment and utilities needed to strip the normal paraffins from the purge effluent.

We have now found that a substantial improvement in separations involving the use of molecular sieves is realized by employing a novel silanized molecular sieve which has a capacity for adsorbing materials within its sieve cages equivalent to that of an unsilanized sieve but which has the definite advantage of exhibiting superior purging characteristics.

The novel compositions of this invention are silanized crystalline metal alumino-silicates having nominal uniform pore openings between 3 and 15 A and characterized by the presence on their surfaces of radicals having the formula:

where X is $R^3$, H or $OR^{10}$ and where $R^1$, $R^2$, $R^3$ and $R^{10}$ are the same or different and are $C_1$–$C_{10}$ hydrocarbyl radicals. The silanized sieves are prepared by contacting a molecular sieve with a silanizing agent in the amount of 0.01 to 10 pounds of silanizing agent per thousand pounds of molecular sieve, with a ratio of 0.1 to 2 pounds of silanizing agent per thousand pounds of sieve being preferred. The silanizing agents usefully employed in preparing the silanized molecular sieves are hydrocarbyl halosilanes and their condensation products with ammonia, primary amines, secondary amines, or alcohols. The hydrocarbyl disilazanes, silyl amines and alkoxy silanes are examples of these condensation products.

Since only the exterior surface of the molecular sieve is to be subjected to the silanizing treatment of our invention, the silanizing agent must be selected so that it is incapable of passing through the uniform pores of the sieve and into the sieve cage. For this reason the effective molecular diameter of the silanizing agent must be sufficiently greater than the uniform pore opening to prevent the silanizing agent from passing through the pore opening. For example, the uniform pores of a type 5A molecular sieve have a free aperture size of 4.2 A. However, the elasticity and kinetic energy of incoming molecules allows easy passage of molecules having an effective molecular diameter of 5 A. Thus this 5A sieve is often referred to as having a *nominal* uniform pore opening of 5 A even though the *actual* pore opening is 4.2 A. Similarly, the type 4A sieve has an *actual* pore opening of 3.5 A but is said to have a *nominal* uniform pore opening of 4A since molecules having effective diameters as large as 4 A pass through its pores. Therefore the effective diameter of the silanizing agent must be based not on the *actual* size of the pore opening of the sieve but rather on the effective diameter of a molecule that will pass through the pore opening, i.e., on the, so-called *nominal* pore diameter or opening. The silanizing agent then must have an effective molecular diameter greater than the *nominal* pore diameter of the particular molecular sieve being treated.

The silanizing agents used in our invention may be represented by the formula:

where Z is H, $R^3$ or Y, and $R^1$ to $R^6$ and $R^{10}$ are the same or different and are $C_1$–$C_{10}$ hydrocarbyl radicals,
and $R^7$ to $R^9$ are the same or different and are H or $C_1$–$C_{10}$ hydrocarbyl radicals. Further, the effective molecular diameter of the silanizing agent must be greater than the nominal uniform pore opening of the molecular sieve.

Examples of useful $C_1$–$C_{10}$ hydrocarbyl radicals are the $C_1$–$C_{10}$ saturated hydrocarbon radicals (alkyls), phenyl and tolyl radicals and the cycloparaffinic, dicycloparaffinic and naphthyl radicals.

Examples of useful silanizing agents are trimethylchlorosilane, dimethyldichlorosilane, dimethylchlorosilane, triphenylchlorosilane, dimethyl- dimethoxysilane, trimethylmethoxysilane, tetramethyldisilazane, hexamethyldisilazane, and hexaphenyldisilazane, with dimethyldichlorosilane (DMDCS), trimethylchlorosilane (TMCS), triphenylchlorosilane (TPCS) hexamethyldisilazane (HMDS) and trimethylmethoxysilane being particularly useful.

It is postulated that silanizing agents decrease the capacity of the molecular sieves for surface adsorption of polar compounds by reacting with the hydroxyl radicals on the surface of said molecular sieve to form, as hereinbefore described, radicals on the said surface. The replacement of OH radicals on the molecular sieve surface with these silane radicals significantly affects the surface adsorption properties of the molecular sieve since it appears that the OH sites on the surface are the main centers of surface adsorption.

The basic formula for crystalline zeolites may be represented by the following formula:

wherein M denotes a metal, $n$ its valence and $x$ and $y$ denote numbers falling within a definite range. The value of $x$ varies depending upon the particular zeolite. For example, in zeolite A the $x$ value falls within the range of $1.85 \pm 0.5$; in zeolite X within the range of $2.5 \pm 0.5$ and in zeolite Y within the range of $3.25 \pm 0.5$.

The value of $y$, which denotes the numbers of mols of water associated with the zeolite, varies depending upon the state of dehydration of the zeolite and with the particular cation associated with the zeolite. Thus the $y$ value for fully hydrated sodium zeolite A is 5:1 and can vary from this maximum value down to essentially 0 depending upon its state of dehydration. In zeolite A, in which 75 percent of the sodium has been replaced by magnesium, the fully hydrated sodium-magnesium zeolite A has a $y$ value of 5.8 and can also be decreased to essentially 0 depending on the state of dehydration. For fully hydrated zeolite X the value of $y$ is 6.2. Partially exchanged forms of zeolite X have $y$ values ranging up to 8. Before use, the molecular sieves are activated for adsorption by removing the water of hydration.

The use of zeolitic molecular sieves for separating mixtures of compounds has been the subject of many recently-issued patents. Unlike other solid materials used in separation processes where the separation is predicated upon the ability of the solid material to adsorb preferentially polar compounds, a separation procedure employing molecular sieves is based primarily upon the difference in the effective molecular diameter of the components of the mixture to be separated and the ability of the molecular sieves to receive in their sieve cages compounds having an effective molecular diameter below a certain size while rejecting compounds having effective molecular diameters above this size.

Molecular sieves, such as zeolite A and zeolite X, effect an initial separation based on effective diameters. However, among the molecules that pass through the pore openings these molecular sieves show a strong preference for molecules that are polar, polarizable and unsaturated and also display the ability of adsorbing large quantities of adsorbate at very low pressures, very low partial pressures or very low concentrations. One or a combination of these properties may be employed in a variety of separations processes. Thus, even though a variety of molecules may pass through the pore openings into the interior of the sieve cages, they may be further separated by taking advantage of the unique characteristics of the molecular sieves. U.S. Pat. No. 2,882,243, 2,882,244 and 3,078,634 to 3,078,645 disclose a variety of separations based on these unusual adsorptive properties of zeolite A and zeolite X.

As indicated previously, one of the most important commercial processes employing molecular sieves at this time separates n-paraffins from isoparaffins, aromatics and cycloaliphatic hydrocarbons with 5 A molecular sieves. In addition, a variety of separations based on the effective molecular diameter of the molecules in a given mixture may be effected with the several molecular sieves commercially available. As illustrative of these separations the table below lists a representative number of molecular sieves and the types of molecular species which will pass through a given pore opening and the types which are excluded for each example of sieve.

| Basic Type of Molecular Sieve | Nominal Pore Diameter, A. | Molecules Adsorbed, (Dia. in A) Effective Diameter less than | Molecules Excluded, (Dia. in A) Effective Diameter greater than |
|---|---|---|---|
| 3A | 3 | 3, e.g., $H_2O, NH_3$ | 3 e.g., ethane |
| 4A | 4 | 4, e.g., ethanol, $H_2S, CO_2, SO_2,$ $C_2H_4, C_2H_6$ and $C_3H_6$ | 4, e.g., propane |
| 5A | 5 | 5, e.g., n-$C_4H_9OH$, n-$C_4H_{10}$, n-$C_3H_8$ to n-$C_{22}H_{46}$ | 5, e.g., iso compounds and all 4 carbon rings |
| 10 X | 8 | 8, e.g., iso paraffins, iso olefins, and $C_6H_6$ | 8, e.g., di-n-butylamine |
| 13X | 10 | 10, e.g., benzene, toluene and all the above | 10, e.g., $(C_4F_9)_3N$ |

Other separations which rely principally on some of the properties of the sieves other than pore diameter include a wide variety of useful processes. For example, other uses for zeolite A molecular sieves of either 4 or 5 A nominal pore size are the separation of carbon dioxide from the gaseous mixtures comprising nitrogen, hydrogen, carbon monoxide, methane and ethane as disclosed in U.S. Pat. No. 3,078,638 and the separation of hydrogen sulfide from a gaseous mixture comprising hydrogen, carbon dioxide, methane and ethane as disclosed in U.S. Pat. No. 3,078,640. U.S. Pat. No. 3,078,641 teaches the use of zeolite X for separating hydrogen sulfide from the gaseous mixture consisting of hydrogen and alkanes containing less than six carbon atoms and U.S. Pat. No. 3,078,643 discloses the use of zeolite X for separating toluene from a gaseous mixture comprising toluene and hexane.

By silanizing the exterior of the particular zeolitic molecular sieve being employed to effect a separation, significant improvements will be realized in a purging operation utilized to remove surface-adsorbed molecules from the sieves.

All the various forms of crystalline zeolitic molecular sieves can be converted to the silanized form in accordance with this invention with the resulting substantial improvement in the removal of surface adsorbed material from the sieve without adverse effect on their capacity for adsorption within the sieve cages. Zeolite X, zeolite Y and zeolite A can be converted to silanized zeolitic molecular sieves by contact with the silanizing agent in the prescribed amounts of 0.01 to 10, or preferably 0.1 to 2.0, pounds of silanizing agent per thousand pounds of molecular sieve.

The silanized molecular sieves of our invention are useful in a variety of separation processes. For example they may be employed to separate compounds having different effective molecular diameters by selecting a molecular sieve having a nominal pore opening within the range of effective molecular diameter of the compounds to be separated and approximately equal to the effective diameter of the molecules at or substantially at the desired cut point. With the molecular sieves currently available this would means an effective molecular diameter in the range of 3–15 A. Ideally the nominal pore opening of the molecular sieve employed in the separation should permit the passage into the sieve cages of all the molecules having effective diameters smaller or equal to those at the desired separation point while excluding all the larger molecules.

It is known that, when using molecular sieves to effect separations of materials based on their effective molecular diameter, the time necessary for the complete saturation of the sieve cages during adsorption and the complete removal of molecules from the sieve cages during desorption can be extremely prolonged. Further, it is known that more effective use may be made of the sieve if the adsorptive capacity of the sieve cage is not completely or even substantially satisfied and if the sieves are not completely or even substantially depleted of the pore adsorbed molecules. For example, very effective use is made of a molecular sieve in commercial processes where during the adsorption step the sieve capacity is satisfied to at least 60 weight percent and is terminated before the 100 percent saturation point is reached. Similarly sieve utilization is most effective if during the desorbing step only 70 to 90 wt. % of the molecule adsorbed within the sieve cages are removed.

In petroleum processing, our invention will also find utility. For example, silanized molecular sieves having a nominal pore opening of 5A find particular usefulness in the separation of normal paraffins from non-normal paraffins. Specifically a mixture of normal and non-normal $C_7$–$C_{22}$ hydrocarbons, as well as narrower cut mixtures, are readily separable with type 5A silanized molecular sieves of our invention. As with other processes, sieve utilization or sieve efficiency is optimized by "under-adsorbing" and "under-desorbing" as described above. However, it is often found desirable to fully utilize the adsorptive sieve capacity when separating these hydrocarbon mixtures. In this case, it has been found to be advantageous to continue passing the hydrocarbon mixture through the sieve bed after the sieve capacity is satisfied. Continuing the flow of feed past the "breakthrough" point is referred to as "overcharging". Overcharging insures complete loading of the sieve and often results in a 10–15 percent excess of feed being passed through the sieve bed.

It is also known that an effective purge and desorb medium for a hydrocarbon separation utilizing molecular sieves is an essentially normal paraffin stream having either about one to three carbons less than the lightest hydrocarbon component of the mixture or about one to eight carbons more than the heaviest hydrocarbon component of the feed mixture. These purge and desorb mediums are equally useful when the silanized molecular sieves of our invention are used to effect the separation of a hydrocarbon mixture.

Following is a description by way of example of methods of carrying out the practice of the present invention.

EXAMPLE 1

A gas chromatographic column measuring 2 feet in length and 0.375 inch in outside diameter was filled with a 5 A molecular sieve sold under the tradename, Linde 5A Sieve. Before filling the column, the sieves were ground and screened to 30–40 mesh. Thereafter the column was heated in the chromatograph to 482°F. and two successive 10 microliter portions of a non-normal (nominal $C_{10}$–$C_{13}$) kerosene fraction were passed through the column in a helium flow of 100 ml. per minute. The samples of non-normals trailed out of the column in broad, tailing peaks of 138–150 mm. in width.

The molecular sieves in the column were then silanized, in situ, by passing a 0.5 ml (liquid) portion of trimethylchlorosilane through the column in a helium flow rate 100 ml. per min. Thereafter two successive 10 microliter portions of the same $C_{10}$–$C_{13}$ non-normal kerosene fraction were passed through the column as before. These samples of the non-normals had peak widths of 86 and 100 mm. respectively.

EXAMPLE 2

The silanized sieve of Example 1 above was then treated with an admixture of 0.5 ml. of hexamethyldisilazane and 2 microliters of trimethylchlorosilane.

Following this treatment, two successive 10 microliter portions of the non-normal $C_{10}$–$C_{13}$ cut of the same kerosene fraction were passed through the column. Peaks of 80 mm. and 74 mm. in width, respectively were observed.

These tests indicate that silanizing the molecular sieve either decreases its propensity for surface adsorbing non-normal paraffins, or else some of the non-normals are held less strongly and thus are more easily removed by a purge medium.

EXAMPLE 3

A test was made to determine whether silanizing the sieve had any deleterious affect on its ability to adsorb normal paraffins. This was done using an analytical procedure for determining normal paraffins by a substractive gas chromatographic technique. In this procedure the n-paraffins in a portion of sample are subtracted therefrom by passing the samples in a carrier stream of helium through a 2 inch column of 30–40 mesh type 5A molecular sieves followed by measuring the amount of material not subtracted in the sieves.

Test runs were made by analyzing a nominal $C_{10}$–$C_{14}$ normal paraffin sample with the above analytical procedure, both before and after the molecular sieves in the subtractor column were silanized with 0.2 ml. of trimethylchlorosilane. The results were comparable, thereby indicating that the ability of the sieve to adsorb normal paraffins is not impaired by the silanization treatment.

EXAMPLE 4

The method of Example 1 was repeated and the column filled with Linde 5A molecular sieve and another column filled with a molecular sieve sold under the tradename Linde 5A-XW Sieve. Both sieves were unsilanized. The results of passing 10 microliter portions of the non-normal $C_{10}$–$C_{13}$ cut of the kerosene fraction through the columns are shown in Table A below.

This test was repeated after both columns had been silanized by treatment with 0.5 ml. portions of hexamethyldisilazane. The treated sieves were each contacted with 10 microliter portions of $C_{10}$–$C_{13}$ non-normal paraffins and the results are shown in Table A below:

TABLE A

|  | Width of Peak, mm. | |
|---|---|---|
|  | 5A Sieve | 5A-XW Sieve |
| Untreated | 162 | 154 |
| Treated | 77 | 101 |

These data indicate that both the 5A and 5A-XW sieves in a silanized condition are either less susceptible to surface adsorption of non-normal hydrocarbons, or the non-normals are less strongly held on the surface.

EXAMPLE 5

Type 5A-XW Linde molecular sieve was ground and screened to a 20–60 mesh size and then activated in an air stream at 650°F. for 3 hours. 27.95 grams of this sieve were placed in 6 foot length of 0.25 inch O.D. copper tubing which served as the column for an F&M Model 720 gas chromatograph. The sieve in the column was activated overnight at 662°F. while passing helium therethrough.

A $C_{10}$–$C_{13}$ cut of a hydrotreated kerosene fraction having a boiling range of 364–474°F. was treated with silica gel to separate the aromatic portion therefrom. A 50 microliter portion of the separated aromatic fraction was introduced into a stream of helium passing through the activated column at 482°F. and 100 ml. per min. This was done to precondition the sieve, i.e., to equilibrate it with aromatics at test conditions. Then a 5 microliter sample of the aromatic fraction was introduced into the helium stream and passed through the column. The width of the peak noted is shown in Table B below.

The column containing unsilanized 5A-XW sieve was then treated with three successive 5 microliter portions of trimethylchlorosilane. A 5 microliter portion of the aromatic fraction was then introduced into the stream of helium and passed through the column. The width of the chromatographic peak measured is shown in Table B.

TABLE B

|  | Width of Peak, mm. |
|---|---|
| Untreated | 163 |
| Treated | 130 |

These data indicate that silanized 5A-XW sieve is less susceptible to surface adsorption of aromatic hydrocarbons or these hydrocarbons are less strongly held on the surface than untreated sieve.

EXAMPLE 6

The column of Example 5 was used to compare the ease of removal of aromatic hydrocarbons from unsilanized and silanized 5A-XW sieve. 27.95 grams of the sieve were placed in the column for each of the test runs and were activated and preconditioned as in Example 5. In the run on the unsilanized sieve, 5 microliters of the $C_{10}$–$C_{13}$ aromatic fraction of Example 5 were introduced into a stream of helium flowing through the column at 100 ml. per minute. Following the introduction of the aromatics into the column, measurements were made of the amount of helium required to remove various percentages of the sample from the column. The effectiveness of various amounts of purge gas are shown in Table C below.

Tests were made on silanized sieve that was treated either with trimethylchlorosilane (TMCS) or hexamethyldisilazane (HMDS). The runs were in all respects the same as those for the unsilanized sieve except that prior to the introduction of the aromatic fraction, the sieve was treated with various quantities of TMCS or HMDS. The effectiveness of these silanizing agents on the adsorption and the ease of removal of the aromatics that were introduced into the column in the helium stream are shown in Table C.

TABLE C

Purge Gas Removal of Aromatics from Treated and Untreated 5A-XW Molecular Sieves

| Run No. | 1 | 2 | 3 | 4 | 5 | 6 |
|---|---|---|---|---|---|---|
| Silanizing Agent | None | TMCS | TMCS | TMCS | TMCS | HMDS |
| Amount of Silanizing Agent, milligrams per grams of sieve | None | 0.46 | 0.91 | 1.37 | 1.83 | 1.25 |
| Percent Aromatics Removed | | Volume of Purge Gas, ml. | | | | |
| 60 | 205 | 140 | 105 | 80 | 70 | 75 |
| 80 | 340 | 245 | 185 | 140 | 135 | 175 |
| 90 | 550 | 360 | 260 | 210 | 190 | 260 |
| 95 | 850 | 510 | 335 | 280 | 250 | 270 |
| 100 | 1280 | 1025 | 815 | 720 | 675 | 890 |

These data show that sieve treated with 0.46 milligrams TMCS per gram of sieve requires only about two thirds the volume of purge gas to substantially remove the aromatics from the unsilanized sieve while sieve treated with 1.37 milligrams TMCS per gram of sieve requires less than half the volume of purge for the same degree of substantial removal.

HDMS appears to have approximately the same effect as TMCS on a type 5A-XW sieve and the ability of a purge gas to remove surface adsorbed aromatics.

EXAMPLE 7

The adsorptive capacity of 5A-XW molecular sieves for normal paraffins was measured.

In one run, a measured quantity of 5A-XW sieve was contacted with a measured quantity of n-butane gas. 40.6 cc. of butane were adsorbed per gram of sieve. In another test, 5A-XW sieve which had been treated with 2 pounds of hexamethyldisilazane per 1,000 pounds of sieve was contacted with n-butane. The treated sieve adsorbed 40.5 cc. of butane per gram of sieve.

The data demonstrate that the normal paraffin adsorptive capacity of molecular sieves is substantially unimpaired by treating the sieve with a silanizing agent.

EXAMPLE 8

The effect of silanizing a 4A crystalline aluminosilicate was demonstrated.

A gas chromatograph column, 0.25 inches in outside diameter and 1 foot long, was filled with Linde 4A molecular sieves and the sieves were then dried by heating at 662°F for four hours while passing helium through the column. After equilibrating the column with 20 microliters of methylnaphthalene injected into a helium stream of 50 ml/min with the column temperature at 347°F., a 5 microliter portion of methylnaphthalene was introduced into the column in the stream of helium. It required 1,050 ml. of helium to elute the methylnaphthalene from the molecular sieves.

After silanizing the molecular sieves with 40 microliters of hexamethyldisilazane at 482°F, the above run was repeated. Only 650 ml. of helium were required to elute the methylnaphthalene from the silanized sieves.

EXAMPLE 9

The advantage of silanizing a molecular sieve was demonstrated in the reduction in the volume of purge gas necessary to remove surface-adsorbed hydrocarbons in a series of parallel runs.

Each pair of runs was conducted in the gas chromatograph column of Example 8 filled with Linde 5A-XW molecular sieves. The sieves were first dried by passing helium through the column for 5 hours while the column temperature was maintained at 662°F.

The effect of silanizing the external surface of the sieves was evaluated by measuring, in a series of paired runs, the volume of helium necessary to purge or elute methylnaphthalene which was adsorbed on the surface of the molecular sieves. In the first run of each series, the sieves were unsilanized; in the second, the sieves had been silanized with one of a series of silanizing agents.

The procedure followed in each pair of runs was the same. In the first run, the bed of unsilanized sieves was equilibrated with about 15 microliters of methylnaphthalene injected into a helium stream which was passing through the column at 50 ml/min. Then a 5 microliter portion of methylnaphthalene was introduced into the helium and passed through the column and the volume of helium necessary to elute 95 percent of the methylnaphthalene from the molecular sieves was measured. In the second run of each series the bed was heated to the silanizing temperature and a measured quantity of a silanizing agent was introduced into the helium stream and passed through the column. Then, as in the first run, the temperature was reduced to 347°F, the bed was equilibrated with methylnaphthalene, a 5 microliter portion of methylnaphthalene was injected into the column and the volume of helium necessary to purge 95 percent of the methylnaphthalene from the sieves was measured.

The results are presented in Table D, below.

TABLE D

| Test Series | Silanizing Agent | Dosage lb silane/ 1000 No. Sieve | Treating Temp. °F | Vol.(ml.) of helium to purge 95% Untreated | Treated |
|---|---|---|---|---|---|
| A | Dimethyldimethoxy silane | 2.1 | 600 | 495 | 150 |
| B | Dimethyldichloro silane | 1.7 | 600 | 340 | 155 |
| C | Triphenylchloro silane | 6.6 | 600 | 370 | 220 |
| D | Dimethylchloro silane | 2.0 | 482 | 425 | 110 |
| E | Methyldichloro silane | 3.3 | 482 | 440 | 170 |

These data indicate that less purge gas is needed to remove an adsorbed hydrocarbon from the surface of the molecular sieve if it is treated with one of the hydroxyl-reactive organosilanes.

EXAMPLE 10

The case of removal of a kerosene fraction consisting of non-normals from silanized and unsilanized sieves was compared for both 5A and 5A-XW molecular sieves. The test runs were the same as those of Example 5 except that the column length was 12 feet, the amount of sieve was increased proportionately and the column temperature was increased to 590°F.

After activating the column, preconditioning it with the sample and, in those runs requiring it, treating the sieve with the silanizing agent of hexamethyldisilazane prior to preconditioning, a 5 microliter quantity of a kerosene fraction of non-normals was injected into the helium stream and passed through the column. The hydrocarbon sample was composed of a nominal $C_{10}$–$C_{13}$ hydrotreated kerosene which has been treated with molecular sieves to remove all the normal paraffins present. Following the injection of the sample, the amount of helium purge gas needed to move different amounts of the sample all the way through the sieve bed was measured. The effectiveness of the purging with both types of sieves and various amounts of silanizing agent is shown in Table E below. The amount of purge gas is reported in "purge volumes" where one purge volume is defined as the volume of sieve bed.

TABLE E

Purge Gas Removal of Non-normals from Molecular Sieves

| Sieve | 5A | | | 5A-XW | | |
|---|---|---|---|---|---|---|
| Amount of Silanizing agent, lbs./1000 lbs. of Sieve | None | 0.95 | 1.90 | None | 0.89 | 1.78 |
| Percent Non-normals Removed | Number of Purge Volumes | | | | | |
| 80 | 4.2 | 2.6 | 1.5 | 1.4 | 0.8 | 0.4 |
| 85 | 5.4 | 3.4 | 2.0 | 1.7 | 1.1 | 0.5 |
| 90 | 7.0 | 4.6 | 2.7 | 2.8 | 1.9 | 0.6 |
| 95 | 10.3 | 7.6 | 4.8 | 5.6 | 3.4 | 1.5 |
| 98 | 14.4 | 11.2 | 7.9 | 9.7 | 5.8 | 1.9 |

EXAMPLE 11

The effectiveness of silanized and unsilanized molecular sieves was compared in pilot plant equipment for extended periods.

The equipment consisted of two sieve vessels, each of approximately 8,000 cc. volume. The piping and valving and the cycle times were so arranged that while feed stock was being charged to one sieve vessel the other was being depressured, purged, repressured and desorbed.

Each vessel was loaded with approximately equal amounts of Linde 5A-XW molecular sieves, 14,619 grams in vessel I and 14,437 grams in vessel II. Prior to making the first pilot run, the molecular sieves in vessel II were silanized as follows:

1. The sieve bed was heated to an average temperature of 480°F. with a stream of nitrogen gas flowing down through the bed at a flow rate of 178 SCFH, a velocity of 0.6 ft./sec. and a pressure of 10 psig.

2. 9.1 cc. of hexamethyldisilazane (HMDS) were injected into the nitrogen stream at the entrance to the vessel. This is equivalent to a dosage of approximately 1 lb./1,000 lbs. of sieve.

3. The nitrogen flow through the bed was continued for two hours after the injection of the HMDS.

The bed temperature of both vessels were then raised to approximately 600°F. and a series of test runs was made.

A summary of the operating conditions is listed below in Table F.

TABLE F

| Cycle Times, min. | Test 1 | Test 2 |
|---|---|---|
| Adsorbing | 27.0 | 26.0 |
| Depressuring | 0.5 | 0.5 |
| Purging | 2.0 | 1.0 |
| Repressuring-desorbing | 24.5 | 24.5 |
| Total | 54.0 min. | 52.0 min. |
| Sieve Bed Temperature | | 600°F. |
| Sieve Bed Pressure, Adsorbing | | 20 psig |
| Purging | | 5 psig |
| Desorbing | | 30 psig |

Test 1 was continued for 179 hours while test 2 lasted for 161 hours.

The flow rates of the feed, purge and desorbent streams, in terms of liquid hourly space velocity (LHSV, liquid/volume/hr/volume of sieve), covered the ranges shown in Table G.

TABLE G

| | Test 1 | Test 2 |
|---|---|---|
| Adsorbing, LHSV | 0.36–0.62 | 0.18–0.30 |
| Purging, LHSV | 0.09–0.69 | 0.35–0.80 |
| Desorbing, LHSV | 0.61–0.63 | 0.61–0.62 |

The feed stock was a hydrotreated kerosene having an ASTM boiling range of 337–539°F. and a straight chain hydrocarbon content (normal paraffins) of 18.1 weight percent. The average n-paraffin carbon number was 12.25, on a weight basis.

The desorbent-purge stock had a boiling range of 118–238°63.7 weight percent, all of which was n-heptane.

The typical test run was conducted as follows: The hydrotreated kerosene was passed through sieve vessel I for the assigned adsorbing cycle time (27 or 26 minutes) at a pressure of 20 psig and a fixed flow rate. The effluent from the adsorption cycle was collected in a vessel. At the end of this cycle, the flow of feed was discontinued and the pressure in the sieve vessel was reduced from 20 to 5 psig in 0.5 min. The sieve vessel was then purged for the proper cycle time of 2.0 or 1.0 minutes by passing the desorbent-purge stock at fixed flow rate through the sieve vessel in a direction countercurrent to that of the feed stock. The purge effluent was collected in a vessel and segregated from the desorbate. The vessel pressure was then increased increased to 30 psig for the desorbing step which continued for 24.5 minutes with the desorbent stock passing countercurrently through sieve vessel I at a fixed flow rate. The desorbate from sieve vessel I was collected in a separate vessel to segregate it from the desorbate from vessel II. Subsequently, the desorbate effluents were delivered to a fractionator where the desorbent was removed as the overhead and the straight chain hydrocarbons were recovered as the bottoms product.

Because of the cyclic nature of the test, while the adsorbing operation was being conducted in vessel I, the depressuring, purging, repressuring and desorbing steps were being carried out in vessel II. At the end of the adsorbing step in vessel I and the desorbing step in vessel II, the feed stock was automatically switched to vessel II, while the depressuring step was automatically commenced in vessel I.

The results of these tests showed that non-straight chain hydrocarbons are more easily removed from the silanized sieve than the unsilanized sieve although silanization of molecular sieves does not appear to reduce the capacity of the sieve to adsorb non-straight chain hydrocarbons on the sieve surface.

Table H lists representative data from the series of ten runs made in each of the tests.

In the table, (a) "purge volume" is the amount of desorbent medium in the purge effluent per cycle, expressed as vapor volume displacements, at purge conditions, of the total sieve bed volume, and (b) "Percent non-normals removed" is the weight percent of the surface-adsorbed non-straight chain hydrocarbons removed in the depressure-purge step and appearing in the purge effluent.

TABLE H

Test I (Cycle time—54.0 min.)

| | Run A | | Run B | | Run C | |
|---|---|---|---|---|---|---|
| | Vessel I (Unsilanized) | Vessel II (Silanized) | Vessel I (Unsilanized) | Vessel II (Silanized) | Vessel I (Unsilanized) | Vessel II (Silanized) |
| Feed rate, adsorbing, LHSV | 0.61 | 0.61 | 0.49 | 0.49 | 0.36 | 0.36 |
| Purge rate, LHSV | 0.39 | 0.35 | 0.19 | 0.09 | 0.56 | 0.57 |
| Desorb rate, LHSV | 0.63 | 0.63 | 0.61 | 0.61 | 0.63 | 0.63 |
| Purge volume | 3.32 | 3.05 | 1.65 | 0.77 | 4.80 | 4.84 |
| Percent non-normals removed | 96.91 | 99.26 | 95.88 | 98.66 | 88.63 | 99.18 |
| Product purity, wt. percent normal paraffins | 98.8 | 99.5 | 98.8 | 99.3 | 99.1 | 99.7 |

TABLE H—Continued

Test II (Cycle time—52.0 min.)

|  | Run D | | Run E | | Run F | | Run G | |
| --- | --- | --- | --- | --- | --- | --- | --- | --- |
|  | Vessel I (Unsilanized) | Vessel II (Silanized) | Vessel I (Unsilanized) | Vessel II (Silanized) | Vessel I (Unsilanized) | Vessel II (Silanized) | Vessel I (Unsilanized) | Vessel II (Silanized) |
| Feed rate adsorbing, LHSV | 0.30 | 0.30 | 0.30 | 0.30 | 0.25 | 0.25 | 0.18 | 0.18 |
| Purge rate, LHSV | 0.45 | 0.38 | 0.44 | 0.35 | 0.58 | 0.52 | 0.78 | 0.73 |
| Desorb rate, LHSV | 0.61 | 0.61 | 0.61 | 0.61 | 0.62 | 0.62 | 0.62 | 0.62 |
| Purge volume | 1.93 | 1.64 | 1.90 | 1.51 | 2.49 | 2.23 | 3.34 | 3.09 |
| Percent non-normals removed | 99.27 | 99.38 | 97.76 | 98.89 | 94.31 | 97.89 | 97.00 | 98.67 |
| Product purity, percent normal paraffins | 99.7 | 99.7 | 99.2 | 99.5 | 98.0 | 99.2 | 98.9 | 99.4 |

Figure 1:
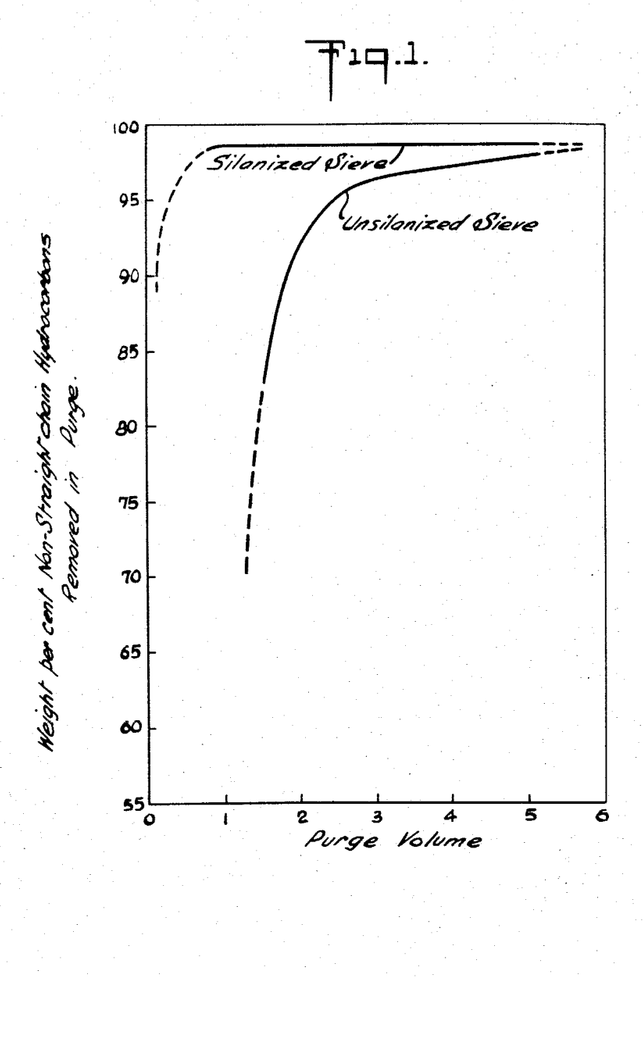
Figure 2:
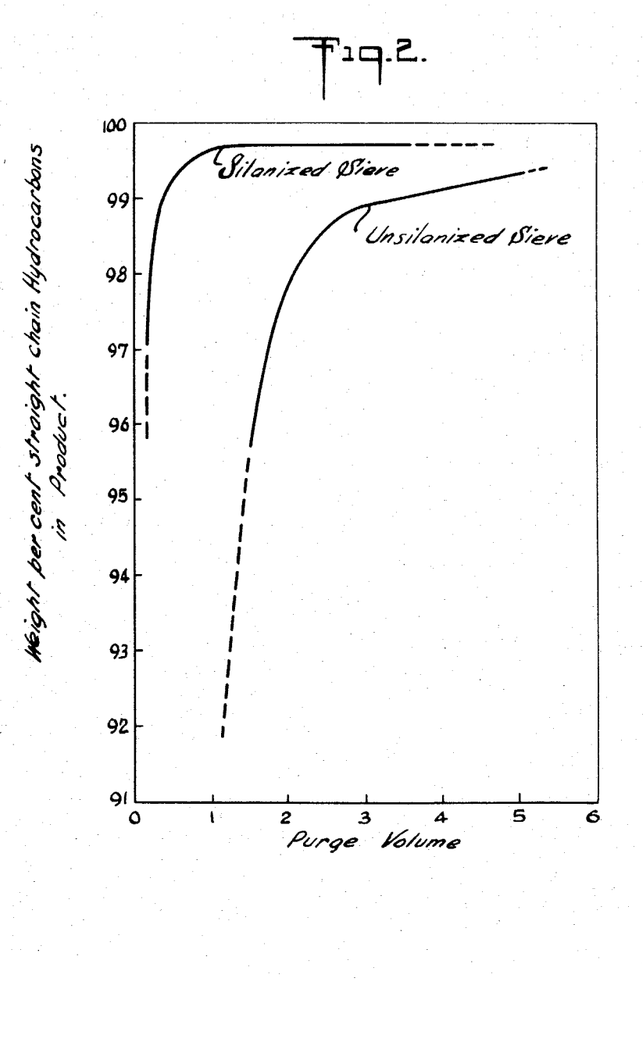

From the data of these test runs, FIGS. 1 and 2 were prepared. These show the relationship, respectively, of silanization on the "percent non-normals removed" and the normal paraffin content of the product versus purge volume.

These figures show that a. silanizing a molecular sieve permits a greater degree of non-normal removal for a particular purge volume as compared to an unsilanized sieve or stated another way, silanizing the sieve permits the same degree of non-normal removal with a smaller purge volume, and, b. silanizing a molecular sieve also produces a higher purity normal paraffin product for the same degree of purge severity as compared to an unsilanized sieve, or silanizing the sieve permits the same product purity with a less severe purging operation.

We claim:

1. A process of preparing a silanized molecular sieve which comprises:

contacting a crystalline metal aluminosilicate molecular sieve having nominal uniform pore openings between 3 and 15 A with a silanizing agent in an amount between 0.01 to 10 pounds of silanizing agent per thousand pounds of said molecular sieve to form silane radicals on the surface of said molecular sieve, said radicals having the formula:

where X is $R^3$, H or $OR^{10}$ and said silanizing agent having the formula:

where Z is H, $R^3$ or Y,

$R^1$ to $R^6$ and $R^{10}$ are the same or different and are $C_1$–$C_{10}$ hydrocarbyl radicals, and $R^7$ to $R^9$ are the same or different and are H or $C_1$–$C_{10}$ hydrocarbyl radicals and where the effective molecular diameter of said silanizing agent is greater than the nominal uniform pore opening of said molecular sieve whereby said silanizing agent is unable to pass through the uniform pore opening.

2. A process according to claim 1 where the molecular sieve has a nominal uniform pore opening of 5 A and the silanizing agent Y is Cl, Z is $R^3$ and $R^1$, $R^2$ and $R^3$ are each methyl.

3. A process according to claim 1 where the molecular sieve has a nominal uniform pore opening of 5 A and in the silanizing agent Y is Z is $R^3$, $R^1$, $R^2$, $R^3$, $R^5$, $R^6$ and $R^9$ are each methyl and $R^8$ is H.

4. A process according to claim 1 where in the silanizing agent Z is Y, Y is Cl and $R^1$ and $R^2$ are each methyl.

5. A process according to claim 1 where in the silanizing agent Z is H, Y is Cl and $R^1$ and $R^2$ are each methyl.

6. A process according to claim 1 where in the silanizing agent Y is

Z, $R^8$ and $R^9$ are each H, and $R^1$, $R^2$, $R^5$ and $R^6$ are each methyl.

7. A process according to claim 1 where in the silanizing agent Y is Cl, Z is $R^3$ and $R^1$, $R^2$ and $R^3$ are each phenyl.

8. A process according to claim 1 where in the silanizing agent Y is

Z is $R^3$, $R^8$ is H and $R^1$, $R^2$, $R^3$, $R^5$, $R^6$ and $R^9$ are each phenyl.

9. A process according to claim 1 where in the silanizing agent Z is Y, Y is $O$–$R^{10}$ and $R^1$, $R^2$ and $R^{10}$ are each methyl.

10. A process according to claim 1 where in the silanizing agent Y is $O$–$R^{10}$, Z is $R^3$ and $R^1$, $R^2$, $R^3$ and $R^{10}$ are each methyl.

11. A silanized crystalline metal aluminosilicate molecular sieve having nominal uniform pore openings between 3 and 15 A, said silanized sieve being characterized by the presence on its surface of radicals having the formula:

where X is $R^3$, H or $OR^{10}$ and where $R^1$, $R^2$, $R^3$ and $R^{10}$ are the same or different and are $C_1$–$C_{10}$ hydrocarbyl radicals.

12. A silanized molecular sieve according to claim 11 where X is $R^3$ and $R^1$, $R^2$ and $R^3$ are each methyl.

13. A silanized molecular sieve according to claim 11 where X is H and $R^1$ and $R^2$ are each methyl.

14. A silanized molecular sieve according to claim 11 where X is $R^3$ and $R^1$, $R^2$ and $R^3$ are each phenyl.

15. A silanized molecular sieve according to claim 11 where X is $OR^{10}$ and $R^1$, $R^2$ and $R^{10}$ are each methyl.

* * * * *

PO-1050
(5/69)

UNITED STATES PATENT OFFICE
CERTIFICATE OF CORRECTION

Patent No. 3,725,302          Dated April 3, 1973

Inventor(s) JESSE H. SHIVELY and EDWARD D. ARCHER

It is certified that error appears in the above-identified patent and that said Letters Patent are hereby corrected as shown below:

Title page, line 2 and Item [75], "Shimely", each occurrence, should read --Shively--.

Title page, Column 2, line 5, "R. E. Kavanagh" should read --K. E. Kavanagh--.

Column 7, line 21, "means" should read --mean--.

Column 14, line 17, delete "increased", second instance.

Signed and sealed this 13th day of November 1973.

(SEAL)
Attest:

EDWARD M. FLETCHER, JR.
Attesting Officer

RENE D. TEGTMEYER
Acting Commissioner of Patents